Jan. 30, 1962 W. W. DVORAK ETAL 3,018,596
PIPE BUNDLING MACHINE
Filed Sept. 4, 1959 10 Sheets-Sheet 1

INVENTORS.
William W. Dvorak
James L. Gibson
By William P. Porcelli
attorney

United States Patent Office 3,018,596
Patented Jan. 30, 1962

3,018,596
PIPE BUNDLING MACHINE
William W. Dvorak, South Holland, and James L. Gibson, Riverdale, Ill., assignors to Acme Steel Company, Chicago, Ill., a corporation of Illinois
Filed Sept. 4, 1959, Ser. No. 838,268
16 Claims. (Cl. 53—198)

This invention relates to the art of strapping machines of a type generally used to encircle an object or objects with a metal strap for binding purposes and particularly relates to an improved strapping machine adapted to efficiently apply a binder strap about a plurality of objects such as tubes or pipes.

Heretofore, the binding of bundles of tubes and pipes has been primarily a hand operation with the use of hand type strapping tools. When binding together tubes or pipes, arrival at their proper arrangement in a bundle has usually presented a problem. If the pipes are improperly arranged at the time the binder strap is applied, the pipes sometimes subsequently shift and change positions relative to each other to result in a loosening of the binder strap and a deterioration of the bundle. In some cases, very long pipes or tubes, perhaps twenty or more feet in length, are bundled. With such long lengths, unless special fixtures or other means are provided, the arrangement of the pipes in the bundle can vary from end to end because of skewing of the pipes so that they might have different arrangements in the different regions where straps are applied. Subsequent handling of the pipe bundles can cause shifting of the pipes to likewise result in loosening of the binder straps and a deterioration of the bundle. Again, when long pipes or tubes are bundled, their length necessitates application of straps at up to three or four locations in order to hold the pipes tightly enough. If performed by hand, the strapping stations are far removed from each other and this either requires as many workers applying the straps as there are strapping stations or else a single worker must move from station to station to apply the straps. With the present high labor cost, such manual strapping is expensive because it is time consuming.

It is the principal object of this invention to provide an improved pipe bundling and strapping apparatus which minimizes the labor involved in bundling and strapping together lengths of pipes or tubes by providing improved means on the apparatus which receives the pipes from a pipe source, automatically arranges and clamps them in a bundle in their proper stacked relationship, simultaneously encircles and secures a plurality of binder straps about the clamped bundle at as many strapping stations as required, and then ejects the strapped bundle from its strapping position.

It is another object to provide an improved apparatus which can be attached to standard or conventional strapping heads or machines to adapt them for bundling and strapping pipes or tubes in an efficient manner.

It is another object of the invention to provide improved apparatus for bundling pipes comprising a flexible sling which can be suspended as a yoke for reception of the pipes to be bundled, then wrapped tightly around the pipes to group and clamp them in their proper relationship until a binder strap is encircled and secured around them, and then can be straightened out in a slanted path to act as an ejector and ramp down which the strapped bundle can be exuded.

It is still another object of the invention to provide improved bundling and strapping apparatus which can accommodate a wide range of pipe diameters and numbers of pipe per bundle without any material adjustment of the apparatus.

It is another object of the invention to provide improved bundling and strapping apparatus having special adapters for attachment to the pipe bundling portion of the apparatus which insure proper positioning of the pipes in a bundle, a different adapter being used for each particular arrangement and number of pipes to be bundled and strapped.

It is another object of the invention to provide improved bundling and strapping apparatus having a retractable binder strap guide which is in position around a pipe bundle as it is strapped, but which is retractable out of the path of the bundle after strapping so that the bundle can be ejected transversely from the apparatus rather than longitudinally which would be required with a fixed closed loop strap guide, and which would be awkward when the pipes are of long lengths. It is another object to also have the pipe bundling means retractable for the same reason.

Other objects and advantages should appear more fully hereinafter by referring to the accompanying drawings in which.

Figures 1, 1A:
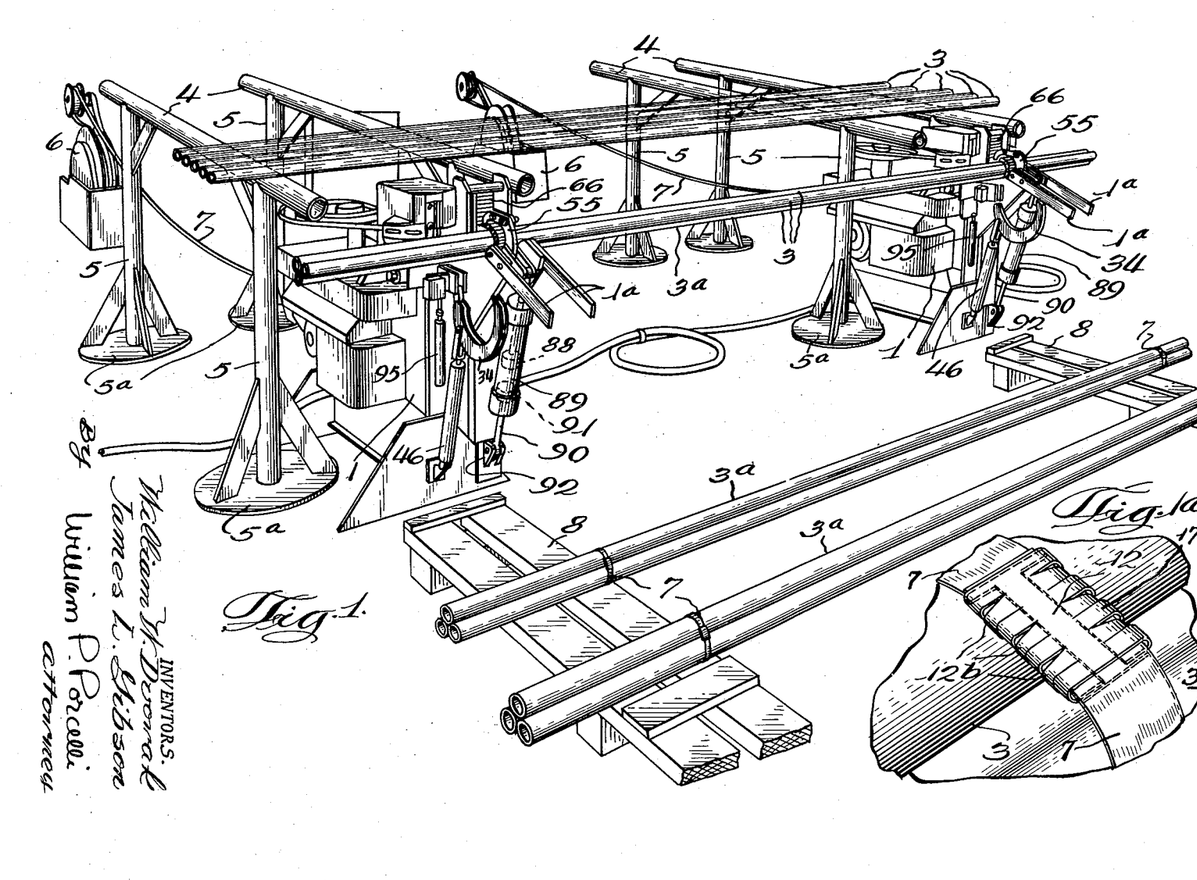
FIG. 1 shows a perspective view of a typical two station pipe bundling apparatus embodying the features of this invention.
FIG. 1a shows an enlarged perspective view of a typical strap joint securing together the overlapping strap ends of a strap loop encircled about a bundle of pipes.

As shown in FIG. 1 in one form of a complete embodiment of the invention, two identical machines 1 are positioned on a floor 2 apart from each other in such a manner that they receive the opposite ends of a plurality of pipes or other tubular objects 3 supplied to them. A store or supply of these pipes 3 is provided above and behind these machines 1 on parallel rails 4 directed toward the machines 1. These rails 4 are supported on vertical legs 5 having enlarged bases 5a which permit them to be placed on the floor 2 in stationary positions without requiring any fastening means. Behind these rails 4 are unreelers 6 which are of a conventional type and support coils of binder strap 7 which is drawn off from the unreelers as feeding mechanism in the machines 1 feed it through the machines. The binder strap 7 is used to bind together the pipes 3 in compact bundles. By having two machines 1, one at each end of the pipes being bundled, it is possible to simultaneously secure a loop of binder strap around both ends of a pipe bundle. If the pipes are of very long length, and they often are, it may be desirable or necessary to place an additional strap about the mid-portion of each pipe bundle 3. If so, an additional machine 1 and its related apparatus can be positioned midway between the two machines shown.

Prior to bundling of the pipes, they are stored on the rails 4 in parallel relationship to each other. When preparing to bundle them, a predetermined number of them are rolled forward on the rails 4 and dropped, still in parallel relationship, into pipe receiving portions of the machines 1 to assume approximate positions as shown for the bundle 3a in FIG. 1. Next, the machines 1 are actuated to properly orient the pipes 3 into a compact bundle and then clamp them in place. After this, loops of binder strap 7 are encircled and secured around the bundle at its end and, after they are secured, the bundle 3a is ejected down an incline formed by arms 1a on the forward ends of the machines 1. The bundle 3a then drops down to platforms 8 at a lower level where they are temporarily stored prior to being removed for shipment and subsequent use.

The machines 1 are basically a conventional type strapping unit adapted to feed out a measured length of binder strap 7 which can be formed into a loop with the leading end of the strap extending into overlapping relationship with its supply end. As is ordinary on this type of strapping machine, the leading end of the strap is gripped to hold it in a fixed position while the supply end of the strap is retracted in order to shrink the strap loop into tight contact around the object or objects being bundled. Means on such a machine is also provided for joining the overlapping strap ends by deforming them into interlocking engagement, usually with an encircling tubular metal seal surrounding the strap ends. Also, strap cutoff means is provided for severing the supply strap end from the encircled strap loop. There are many different varieties of such machines and they are well known in the art. However, the particular strapping machine shown in this application is one which is described and claimed in a co-pending application of Marchand B. Hall, Edward Staron and Robert E. Hager, Serial Number 640,263, filed February 14, 1957. Therefore, the invention resides principally in the combination of a strapping machine with related means for arranging and clamping a bundle of tubular objects in a fixed position, applying a binder strap loop or loops around the bundle while it is held clamped, and then ejecting the bound bundle.

Figure 2:
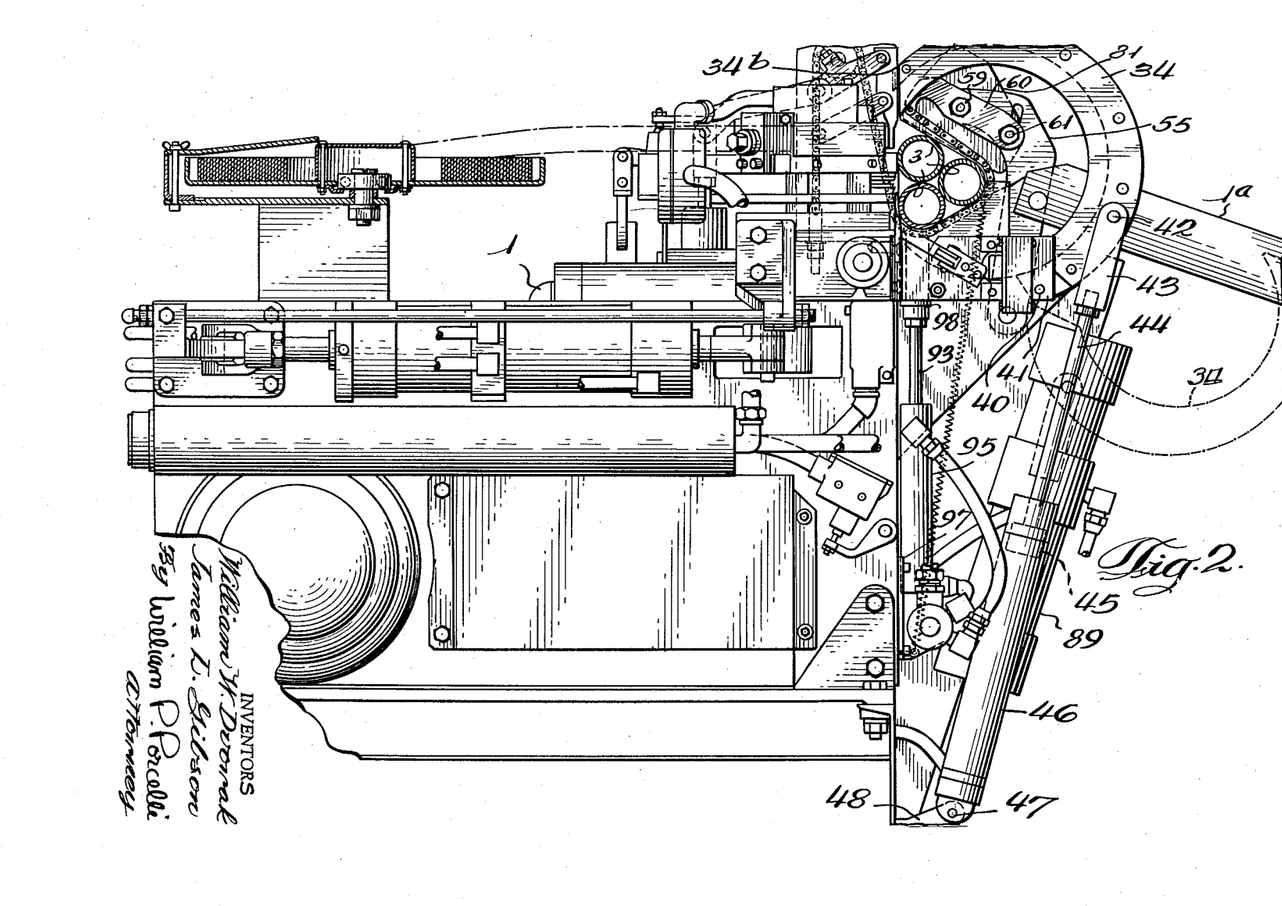
FIG. 2 shows a right side elevation of a single station machine embodying the features of this invention.
Figure 2A:
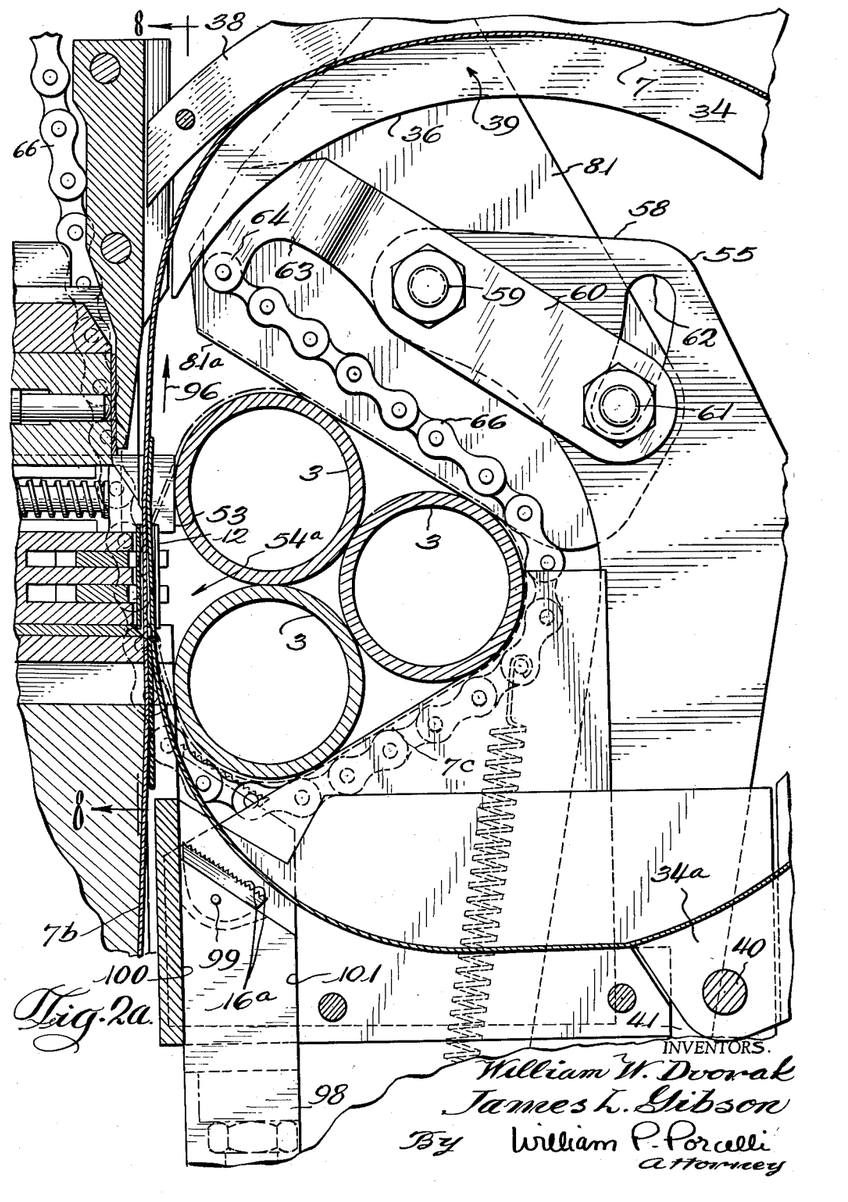
FIG. 2a is an enlarged sectional view of some of the main portions of the machine in its pipe bundling region.
Figures 8, 9, 9A, 9B:
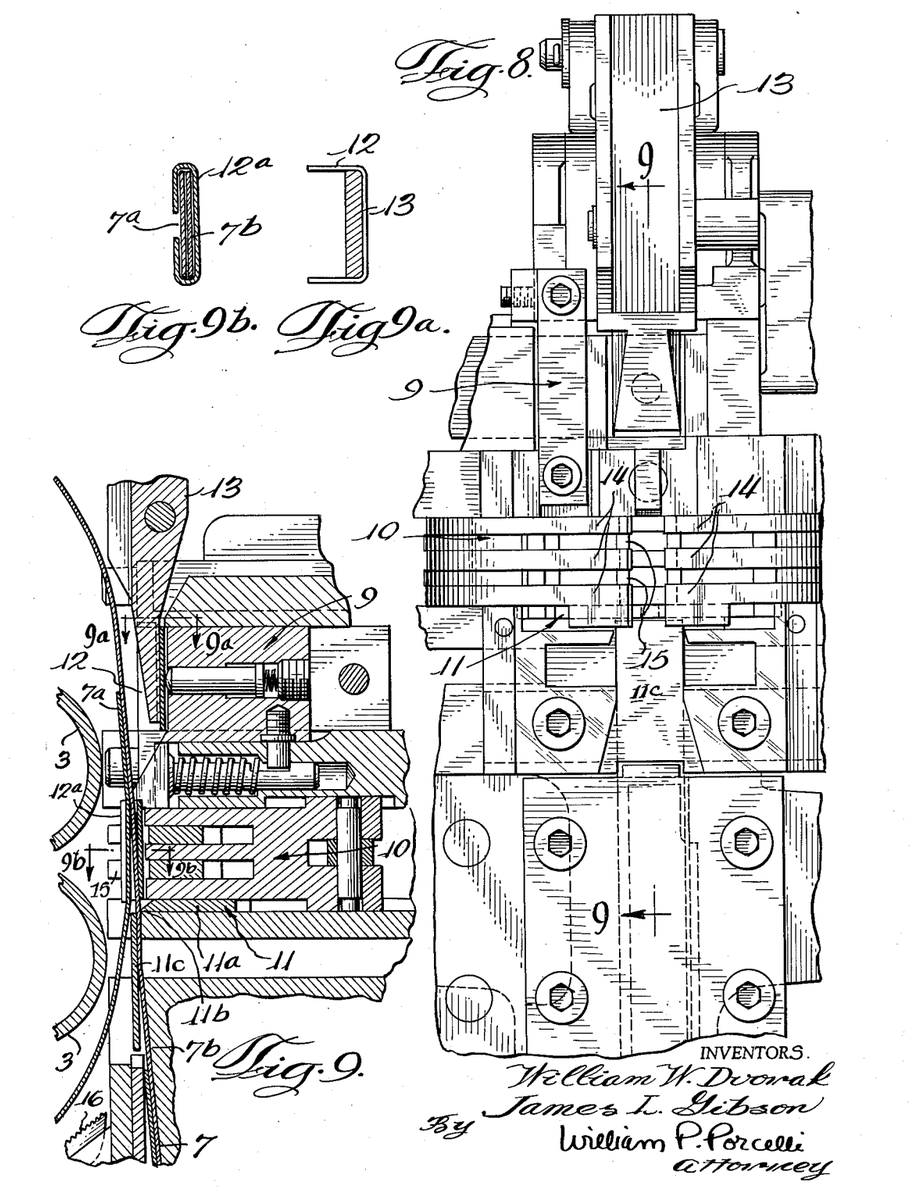
FIG. 8 shows an end view of the portions of the machine relating to the formation of a strap joint as they would appear along the line 8—8 of FIG. 2a, except with the strap and clips not present.
FIG. 9 shows a sectional view along the line 9—9 of FIG. 8, except with portions of the strap and clips present.
FIG. 9a shows a sectional view of a clip formed on the anvil as viewed along the line 9a—9a of FIG. 9.
FIG. 9b shows a sectional view of a clip encircling two overlapping strap ends as viewed along the lines 9b—9b of FIG. 9.

Even though the strapping machines 1 do not per se constitute part of the invention, certain principal portions of the machine are indicated especially in FIGS. 2a, 8 and 9 for purposes of explanation and understanding of such a machine's relationship to the invention. These principal portions of the machines are positioned in sandwiched relationship with each other and are referred to generally as a seal or clip forming and feeding unit 9, a strap joint forming unit 10 and a strap shear unit 11. In these machines, a U-shaped clip or seal 12 is formed over an anvil 13 as viewed in FIG. 9a. The U-shaped seal 12 is fed forward to a position 12a between the jaws 14 and 15 of the strap joint forming unit 10. The jaws 14 are designed to be moved with respect to the fixed jaws 15 to form an interlocking type joint 17 (FIG. 1a) between the clip 12 and the leading strap end 7a and the supply strap end 7b at a time when a strap loop formed by the strap 7 is encircled and shrunk tightly around a bundle of pipes or other tubular objects. After the strap joint is substantially formed, the shearing unit 11 having a movable shear blade 11a is extended to shear the supply strap end 7b from the encircling strap loop as its cutting edge 11b reacts against a fixed shear blade 11c which is positioned between the leading strap end 7a and the supply strap end 7b. However, prior to forming a strap loop around the pipes, the leading strap end 7a is held in a fixed position against one of the pipes 3 by means of a gripper 16 which is movable to and from the support region for the pipes as will hereinafter be described.

A typical joint formed by the strap joint forming unit 10, as shown in FIG. 1a, consists of marginal tabs 12b bent along both margins of the strap ends and encircling seal to provide an interlocked strap joint.

Figures 3, 3A:
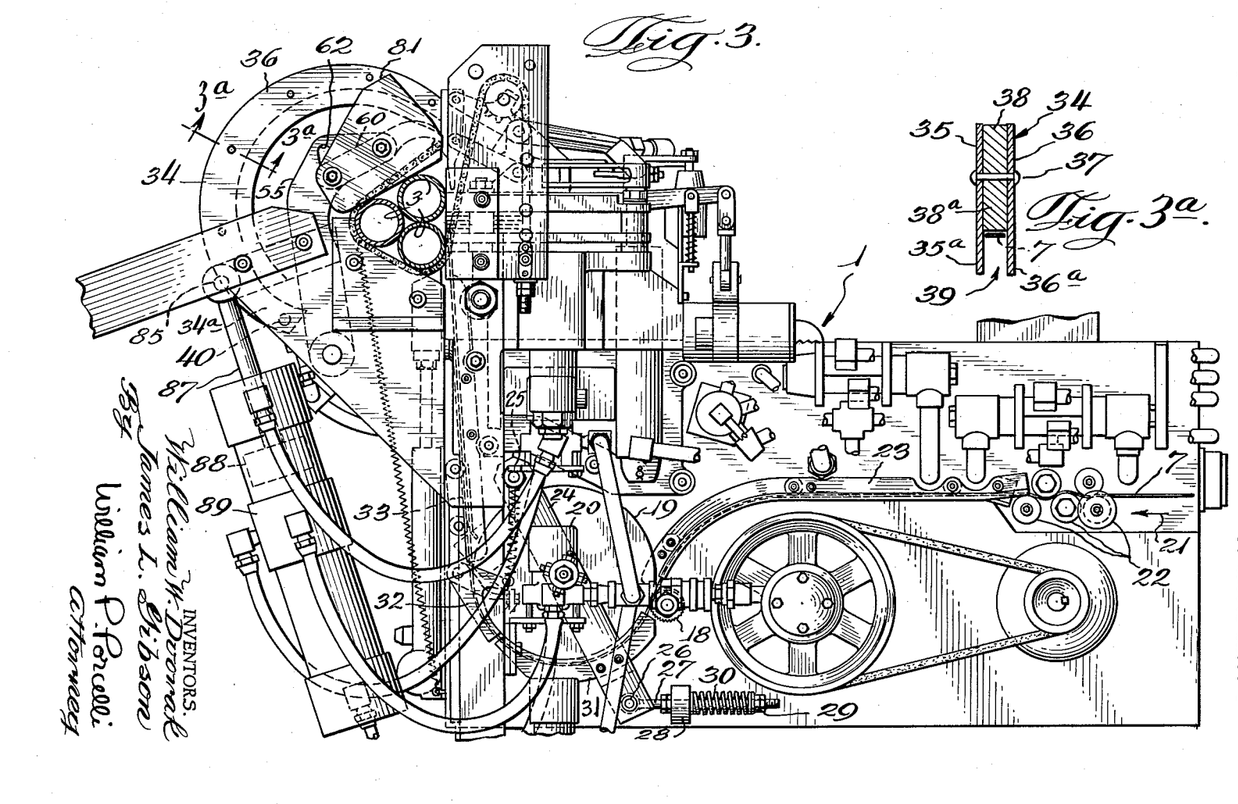
FIG. 3 shows a left side elevation of the machine shown in FIG. 2.
FIG. 3a shows a sectional view of the strap guide track as viewed along the line 3a—3a of FIG. 3.

As shown in FIG. 3, each of the machines 1 is provided with a strap feed wheel 18 powered by a conventional motor in each of the housings of the machines 1. Adjacent the feed wheel 18 is a larger idler wheel 19 mounted on a shaft 20. The strap 7 which is led from the unreelers 6 is fed into the machines in the direction of the arrow 21 where it passes between a series of leveler rollers 22 adapted to relieve the strap 7 of bundle curve. The strap 7 then passes through a guide 23 which guides it to the region between the periphery of the wheels 18 and 19 of each machine. The shaft 20 on which the idler 19 is mounted is secured to an arm 24 pivoted on a shaft 25 to the frame of a machine 1. With this arrangement the arm 24 is mounted to pivot the idler wheel 19 toward or away from the feed wheel 18. The lower end of the arm 24 is secured on a pivot 26 to one end of a shaft 27 which passes through a fixed block 28. The opposite end of the shaft 27 is threaded and provided with a nut 29 which retains a coil spring 30 in place on the shaft 27. This spring 30 reacts between the fixed block 28 and the nut 29 to urge the shaft 27 toward the right as viewed in FIG. 3. This, in turn, urges the idler wheel 19 against the feed wheel 18. Thus, when the strap 7 is fed through the guide 23 and between the idler wheel 19 and the feed wheel 18, the strap is urged against the feed wheel 18 by a squeezing action between the two wheels. Another guide 31 is secured to the arm 24 and guides the strap 7 around the idler wheel 19, through another guide 32, and another guide 33 which leads the strap end into the region where the pipes are to be bound.

In order to guide the strap fed from the feed wheel 18 into a loop about the pipe bundling region, a retractable strap guide 34 is provided at the forward region of the machine. This guide 34 is of a C-shape longitudinally and U-shape in cross section. The U-shape is imparted to it, as shown in FIG. 3a, by means of two side plates 35 and 36 which are mounted by means of rivets 37 on either side of a center piece 38 which is narrower than the side plates 35 and 36. This results in the inner edges 35a and 36a of the side plates extending beyond the inner edge 38a of the center piece 38 to provide a channel shaped opening 39 which acts as a guide for the strap 7 as will be described. One end 34a of the guide 34 is pivoted on a pin 40 to a plate 41 secured to the housing of the machine 1. The other end 34b of the guide 34 is unsecured. For this reason, the guide 34 can be pivoted on the pin 40 between the position shown in dotted lines and the position shown in full lines in FIG. 2, the first position being provided to clear the guide 34 of the pipe receiving or bundling region or zone 54 so that the machine can be loaded with pipe, and the second guide position being its closed position for guiding the strap 7 about a bundle of pipe after the machine is loaded. In the second position, it should be noted that the guide 34 establishes a closed path around the pipe bundling region 54 because the end 34b of the guide 34 abuts the front of the machine 1.

A short distance around the guide 34 is provided another pin 42 which pivots a yoke 43 to the guide 34. The yoke 43 is secured to the outer end of a piston rod 44 whose inner end is connected to a piston 45 mounted for reciprocating movement in a cylinder 46. The cylinder 46 is pivoted on a pin 47 to an ear 48 projecting from the main frame of the machine 1. Fluid is appropriately applied to this cylinder 46 to cause the piston 45 to either extend the piston rod 44 or retract it. When it is extended, this causes the guide 34 to move to its closed position as shown in full lines in FIGS. 2 and 3 and when it is retracted it causes the guide 34 to be moved to its retracted position as shown in dotted lines in FIG. 2.

As particularly indicated in FIGS. 1, 2, 3, 3b and 3c, means are provided for receiving a bundle of pipes and arranging them in their proper relative positions and for clamping them in those positions prior to applying the loops of binder strap 7. Secured to the front of the machine 1 are two parallel plates 49 and 50 which are provided with upper edges 51 and 52 which extend angularly upward away from the front face 53 of the machine so that an acute angle is formed between these surfaces 51, 52 and the front face 53 of the machine. The space within this angular region is the pipe receiving zone 54 of the apparatus. The pipes are dropped from the rails 4 into the pipe receiving zone 54 prior to wrapping, clamping and binding them. Between these two plates 49 and 50 is an L-shaped arm 55 which is journalled at its lower end 57 on a pin 56 mounted at its ends in the plates 49 and 50. The upper end 58 of the arm 55 is provided with a circular opening into which a nut and bolt 59 is fastened to pivotally mount a chain anchor arm 60 to the arm 55. The chain anchor arm 60 is provided at its rear end with another nut and bolt 61 which is fastened to the arm 55 through a curved slot 62. With this arrangement the chain anchor arm 60 can be pivoted on the nut and bolt 59 when the nut and bolt 61 are loosened so that the end of the arm 60 can be moved along the arc of the slot 62. Tightening the nut and bolt 61 secures the end of the arm 60 wherever it is situated along the slot 62. This adjustment permits the forward end 63 of the arm 60 to be raised or lowered as viewed in FIG. 3b. This end 63 is provided with a pivot pin 64 which pivots it to one end 65 of a chain 66 composed of four rows of roller links but not necessarily limited to that number. The other end of the chain 66 passes around a pinion 67 which is journalled on a shaft 68 secured between two side plates 69 and 70 which are secured to the other side plates 49 and 50 in a fixed position by means of screws 71. After the chain 66 passes over the pinion 67, it is secured by means of a pin 72 to a multiple yoke 73 which is provided with a threaded hole in which is secured the threaded end 74 of a shaft 75. The shaft 75 passes through a block 76 secured at its end in the side plates 69 and 70, and the lower end 77 of the shaft 75 is threaded and provided with a locking nut 78. Above the locking nut 78 is a washer 79. A coil spring 80 is held on the shaft 75 with its ends reacting between the lower surface 76a of the block 76 and the washer 79. With this arrangement, the spring 80 tends to urge the shaft 75 downwardly and the lock nut 78 can be adjusted along the shaft 75 to limit the uppermost position of the shaft 75.

Figure 3B:
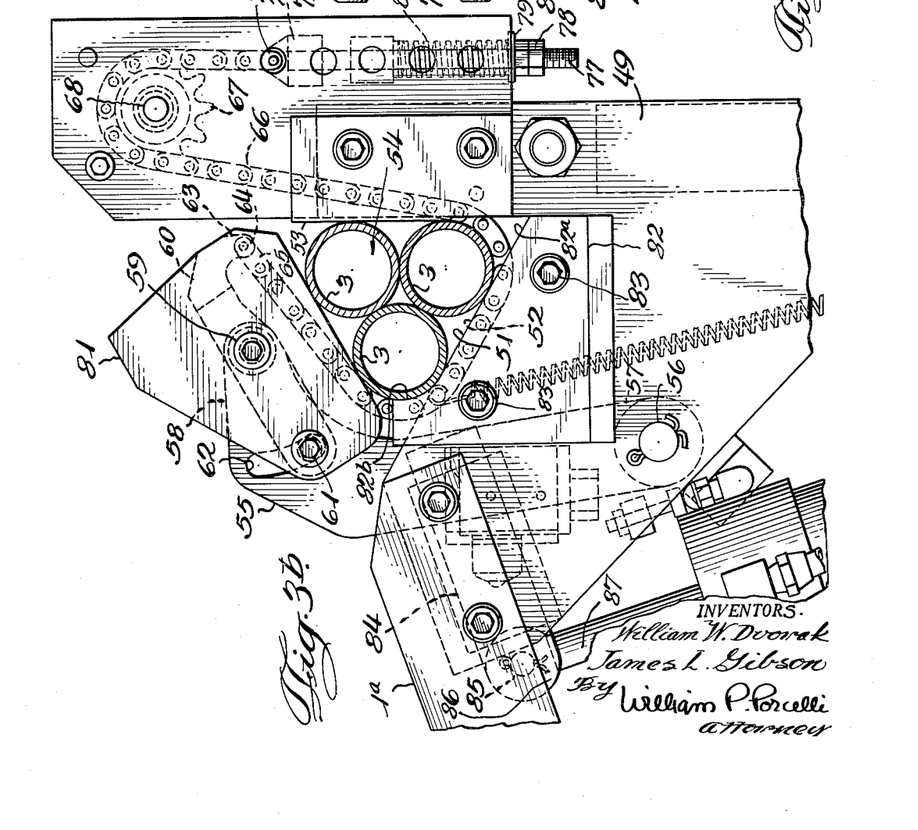
FIG. 3b is an elevation, partly in section, of the machine in the pipe bundling region.
Figure 3C:
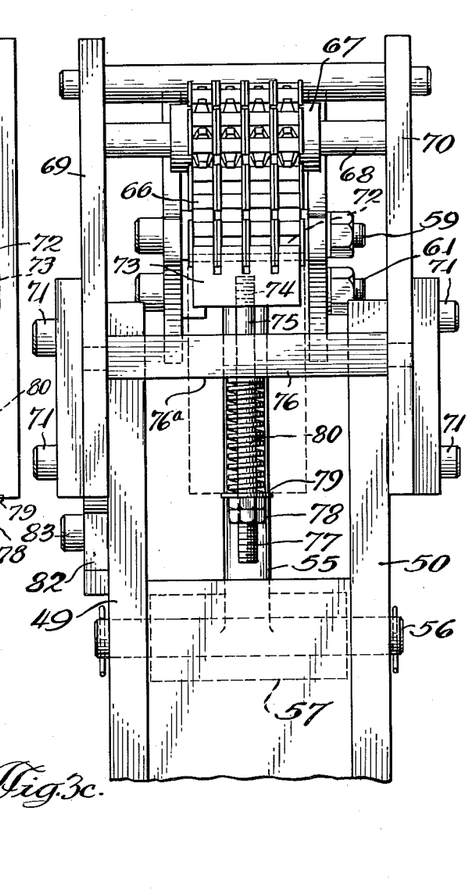
FIG. 3c is an elevation looking from the right of FIG. 3b.

Positioned beside the arm 60 is a clamping plate 81 which is held in place on the arm 60 by means of the two nuts and bolts 59 and 61 as previously mentioned. As the arm 60 is moved angularly on the pivot provided by nut and bolt 59, likewise the angularity of the clamping plate 81 is also changed. With the arm 55 in the position as shown in FIG. 3b, the clamping plate 81 has its lower surface 81a in contact with the pipes 3 positioned in the pipe receiving zone 54. Although not always required, a clamping fixture 82 is secured to the arm 49 by means of screws 83. The purpose of this fixture 82 is to insure the proper positioning of the pipes in a fixed relationship relative to each other. As will be described, this clamping fixture 82 can be suitably interchanged with other fixtures which are used when different numbers and sizes of pipe are to be bundled. In this case, the upper surface 82a of the fixture extends along the same angular inclination as the upper surface 51 and 52 of the plates 49 and 50. As is apparent, this clamping fixture 82 has a rounded portion 82b of the same radius as the three pipes 3 shown in FIG. 3b. With this fixture, as the pipes drop off the rails 4 into the pipe receiving zone 54, they tend to align with each other as shown.

As especially shown in FIG. 2a, it is most desirable to properly align the pipe so that the joint formed between the two overlapping ends of a strap loop around the pipes is positioned in a somewhat triangular void 54a between two pipes positioned against the front face 53 of the machine. The reason for this is that a certain amount of space is ordinarily required to permit the moving jaws of the joint forming mechanism 10 to move behind the strap seal 12 and the overlapping strap ends when a joint is formed. If a pipe is positioned directly in front of the joint forming means, ordinarily there can be no allowance for proper movement of the joint forming jaws as required.

There is a rather unusual feature associated with this machine. When strapping round pipes or other round tubular objects, the most appropriate angle of incline around the fixture 82 for the pipe is one of sixty degrees with the front face 53 of the machine. Similarly, the angularity of the surface 81a of the clamping plate 81 is also sixty degrees. The reason for this is that, with three pipes, lines connecting the centers of the pipes form a sixty degree triangle with one side of the triangle parallel to the front face 53 of the machine. Obviously, then, the triangle formed by lines connecting the centers of the pipes is similar to a triangle formed by the tangents connecting two of the pipes on three sides of the grouping. Since the radii of the pipes are the same, the angularity of the triangles is the same and, so, the surface 82a is at sixty degrees to surface 81a which is at sixty degrees to the surface 53. Peculiarly, as will be shown, this sixty degree angular relationship prevails even when a larger number of pipes are bundled and different fixtures are used.

It may seem that the angularity of the clamping plate 81 need not be adjusted along the slot 62 since it is always the same. However, providing the adjustment eliminates the need for precision manufacture of the arms and also enables the machine to be used with other than round objects which can have different angularity.

As particularly shown in FIGS. 3 and 3b, the arm 55 is provided at approximately its mid-portion with another arm 84 which is secured in a fixed position relative to the arm 55. The outer end of this arm 84 is provided with a pivot pin 85 to which is pivoted the outer end 86 of a piston rod 87 which is connected to a piston 88 mounted for reciprocal movement within the cylinder 89. The lower end of the cylinder has another piston rod 90 (FIG. 1) extending from it. This piston rod is secured to another piston 91 which is also mounted for reciprocating movement within the cylinder 89. The free end of the piston rod 90 is pivoted on a pin 92 to the frame of the machine 1. The particular operating features of these two pistons 88 and 91 will be described subsequently when the entire hydraulic system is described, but it should suffice to say at this point that the piston rod 87 connected to the piston 88 causes the arm 55 to be pivoted on its pin 56 between various positions as the piston rod 87 is moved relative to the pivot pin 92 for the cylinder 89. The arm 84 merely provides a bell-crank arrangement for this movement of the arm 55.

Figures 4, 5:
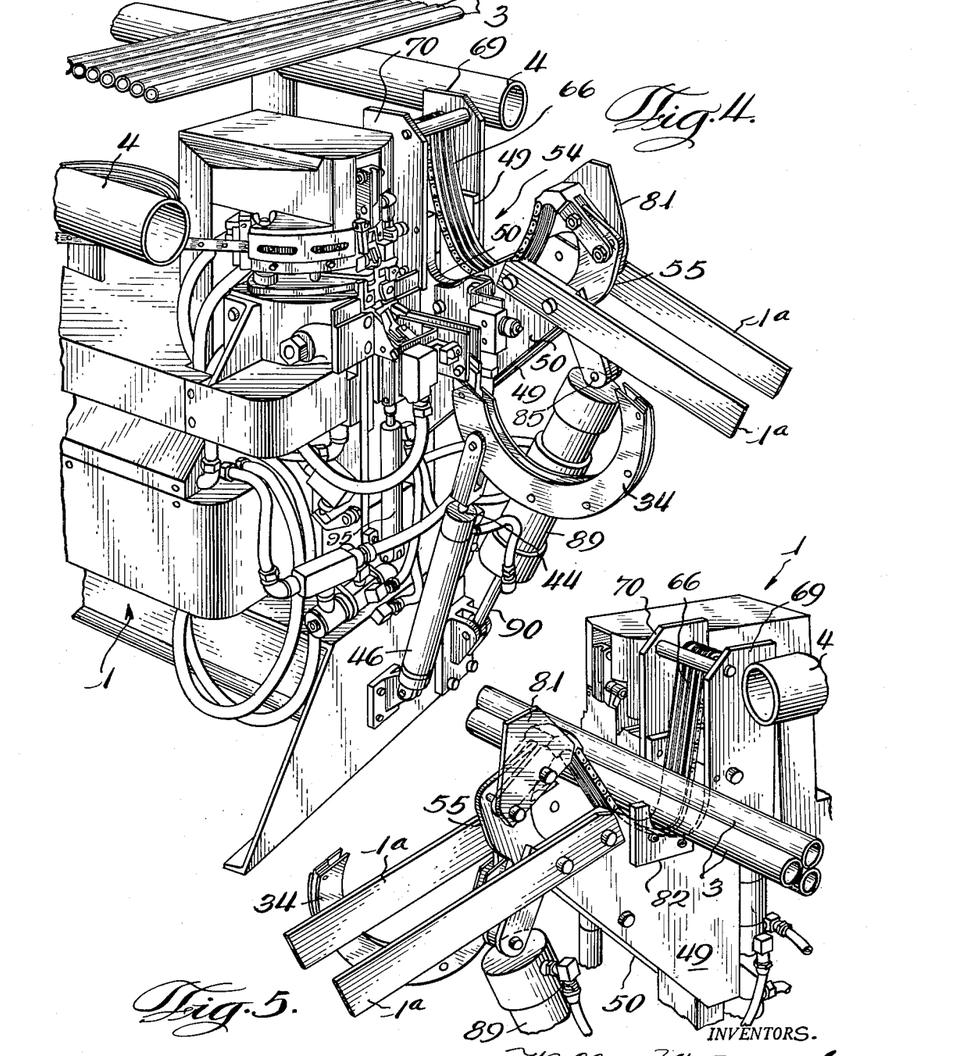
FIGS. 4 through 7 show perspective views of front portions of the machines of FIGS. 2 and 3 as they appear in the critical steps of operation of the machine.

The operating sequence of the machine is best shown in the perspective views of the machine in FIGS. 4 through 7. In FIG. 4, the individual pipes or tubular members 3 are stored on the rails 4. At this time the apparatus is ready for the reception of some of these pipes. The strap guide 34 is shown in its retracted position with the piston rod 44 of the cylinder 46 retracted to hold it in that position. Similarly, the arm 60 is in a position holding the chain 66 in the form or a hanging yoke beneath the pipe receiving zone 54. This position of the arm 60 at this time results from the position of the arm 55 to which it is connected and the arm 55 assumes its position because the piston rod 90 of the cylinder 89 is extended which places the cylinder 89 in a raised position. The operator of the machine pushes the supply of pipes 3 forward on the rails 4 until the proper number of pipes to be bundled drop down into the pipe receiving zone 54 above the yoke formed by the chain 66. In the case being considered, three pipes are dropped into position when the pipes drop into the pipe receiving zone. Two of the pipes then rest on the surfaces 51 and 52 of the plates 49 and 50 and on the surface 82a of the fixture 82 which are all in alignment. Assuming that two machines 1 are being used as shown in FIG. 1, the pipes are then bridged or spanned between two pipe receiving zones 54 of the spaced machines 1. For purposes of explanation, the relationship of the pipes to a single machine 1 is all that is required because it is the same for both machines.

When the pipes are in position in the pipe receiving zone 54 as shown in FIG. 5, the chain 66 is wrapped around the pipes and the strap guide 34 is likewise pivoted upwardly on its pivot 40 to form a closed loop with the front of the machine about the pipe receiving zone. This movement of the strap guide 34 is brought about by extension of the piston rod 44 of the cylinder 46, and the wrapping of the chain 66 is brought about by extension of the piston rod 87 of the cylinder 89. Positions of all parts at this time are shown in FIGS. 2, 2a, 3, 3b and 6. It is important at this time that the clamping plate 81 be positioned on the arm 55 so that its lower surface 81a assumes a sixty degree angle with the front surface 53 of the machine 1 since the tangent connecting the two uppermost pipes 3 assumes a sixty degree angle as previously described. Such angularity provides the most appropriate clamping effect on the pipes which reduces the pipe receiving zone 54 to a triangular shape closely bounding the pipes.

With the pipes clamped, the strap 7 is drawn off from the unreeler 6 and fed endwise around the strap guide 34 as the feed wheel 18 is rotated. The strap 7 is fed beyond the feed wheel 18 through the guides 31, 32 and 33 and up past the joint forming unit 10 in the direction of the arrow 96 (FIG. 2a). As the strap 7 passes by the joint forming unit 10, it is guided through a closed tubular seal 12 which is held in the jaws of the joint forming unit 10. The strap then leads into the unsupported end 34b of the strap guide 34 and is guided around the channel 39 of the strap guide 34. The strap 7 is fed forward through the channel 39 until its leading end 7a again passes through a tubular seal 12 and emerges upwardly beyond it to provide a closed strap loop about the pipes 3 as shown in FIG. 2a. At this time, the piston rod 93 is extended. The piston rod 93 is connected to a piston 94 mounted for reciprocating movement in a cylinder 95. This cylinder 95 is secured to the front face of the machine 1 by means of a bracket 97 as shown in FIG. 2. The upper end of the piston rod 93 is provided with a gripper housing 98 which has pivoted at its end on a pin 99 the strap gripper 16. This strap gripper 16 is provided with sharp teeth 16a at its upper surface. The strap gripper housing 98 is guided between two side walls 100 and 101 in the frame of the machine. When the piston rod 93 is extended, the strap gripper 16 is raised into contact with the portion of the strap 7 extending immediately above it and the gripper 16 presses the strap 7 in that region tightly against the lowermost pipe 3 immediately above it. Then, with this leading portion of the strap 7 held in this manner, the feed wheel 18 is reversed and the supply strap end 7b is thereby withdrawn in a direction opposite to that indicated by the arrow 96 so that the strap loop in the guide 34 is drawn away from the strap guide and shrunk onto the pipes 3. The shrunken strap loop around the pipes is indicated in phantom lines at 7c. After the shrunken loop 7c is formed, the joint forming unit 10 is actuated to produce an interlocking joint 17 between the strap seal 12 and the overlapping strap ends 7a and 7b. Immediately thereafter, the shear blade 11 is actuated to sever the supply strap ends 7b from the strap loop secured around the pipes 3.

Figure 7:
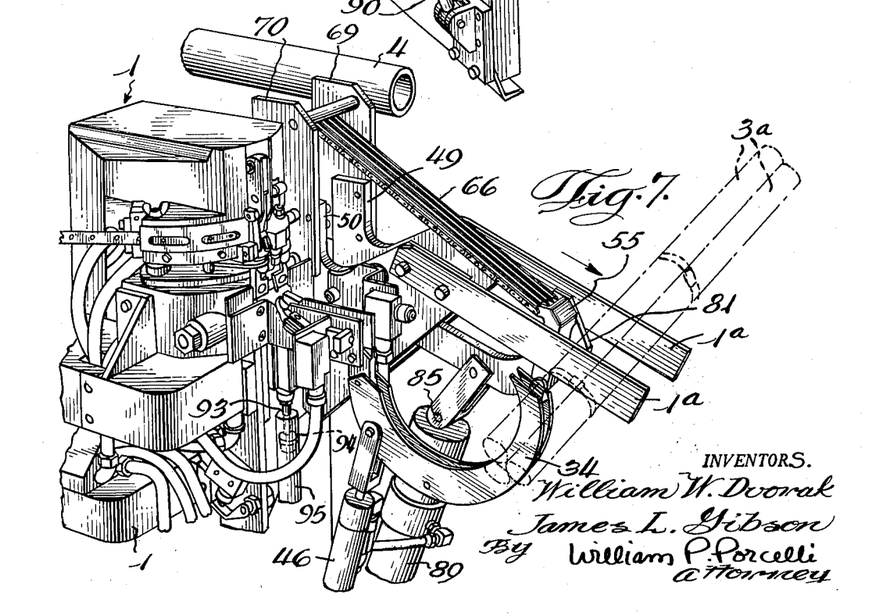

With the pipes 3 strapped together in this manner, the strap guide 34 is then retracted by retraction of the piston rod 44 and the chain 66 is straightened by retracting both piston rods 90 and 87 until all parts assume positions as shown in FIG. 7. As the chain 66 is straightened, it raises the strapped bundle of pipes out of the pipe receiving zone 54 and the strap bundle slides down the straight incline of the chain when it reaches its final position. Secured by means of screws 104 to the upper ends of the plates 49 and 50 are the two slide rails 1a which are sloped downwardly away from the forward end of the machine and provide an exit slide for the strapped pipe bundles 3a which directs the bundles to be properly dropped on the receiving platforms 8 where they are piled prior to subsequent handling.

In FIG. 2, there was indicated a clip forming and feeding unit 9. The tip of the anvil 13 is the portion about which the clip or seal 12 is formed into a U-shape as indicated in FIG. 9a. Subsequent to its formation the clip 12 is driven into jaws of the joint forming unit in preparation for the reception of the strap. Such an arrangement is peculiar to the particular strapping machine indicated and involves no part of this invention as such since it is possible to use pre-formed clips in a stack in a machine and many other variations of operation are possible. Since the anvil 13 is also used as an end guide for the unsupported end 34b of the strap guide 34, if the anvil 13 was not present, a fixed guide portion could be substituted on the machine for the anvil 13.

In FIGS. 10 through 13 are indicated modified fixtures 105, 106, 107 and 108 which can be used when strapping different numbers and sizes of pipe. The object of the use of the fixtures is to insure the sixty degree triangular relationship of lines connecting the centers of the pipes when a row of two or more pipes is flush with the front surface 53 of the machine 1, and also to insure that the appropriate triangular shape opening 54a is in alignment with the center line 109 of the joint forming unit 10 so that a proper movement of the joint forming unit's movable jaws can be effected to properly produce a strap joint on a loop of strap encircled about the pipes.

Figure 10:
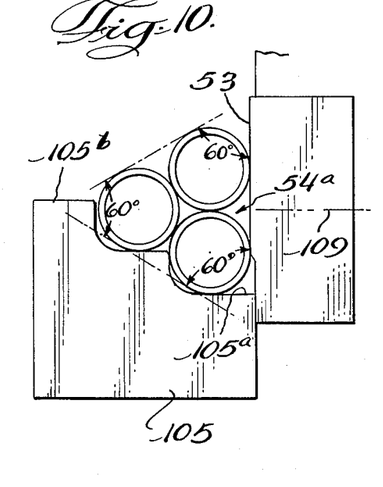
FIGS. 10 through 13 show various pipe bundling arrangements and the types of fixtures which are appropriately used when bundling these pipe arrangements.
Figure 11:
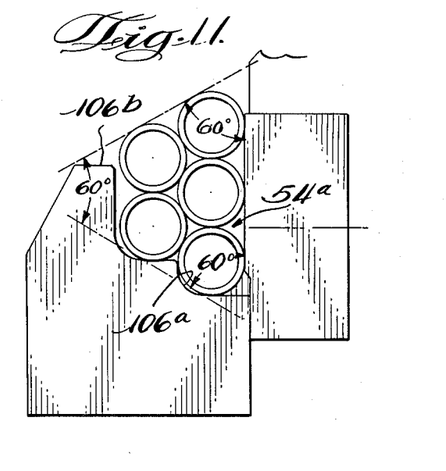
Figure 12:
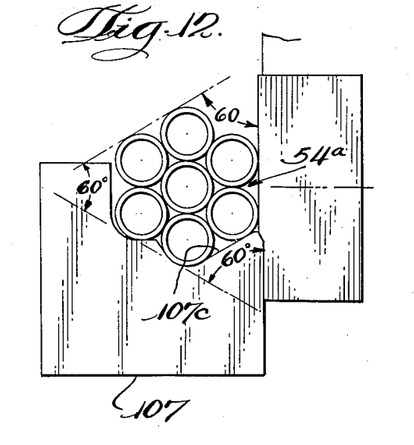
Figure 13:
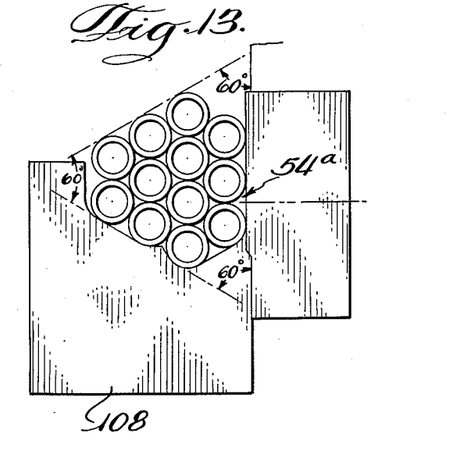

The fixture 105 of FIG. 10 is one which can be used as a substitute for fixture 82 when three pipes 3 are bundled. Its upper surface 105a is of step shape rather than at a fixed angle to further assist in positioning of the pipes as they drop into the pipe receiving zone 54. The fixture 106 of FIG. 11 is similar to the fixture 105 because it is provided with steps along its upper surface 106a. However, two extra pipes are shown located by the fixture and, so, the uppermost level 106b of the surface 106a is extended above the comparable portion 105b of the fixture 105. The fixture 107 of FIG. 12 accommodates seven pipes in a geometrically symmetrical pattern. In addition to a step arrangement similar to that of the fixture 106, an additional inclined surface portion 107c is provided to conform to the shape of the pipe bundle. Note that the surface 107c is at an angle of sixty degrees with the front surface 53 of the machine and the sixty degree triangular relationship generally prevails. The fixture 108 of FIG. 13 is somewhat similar to the fixture 107 but, since it accommodates fourteen pipes in a little different arrangement, the shape of the fixture 108 is likewise different. Again, it should be noticed that the sixty degree angle relationship relative to the front surface 53 prevails.

Figure 14:
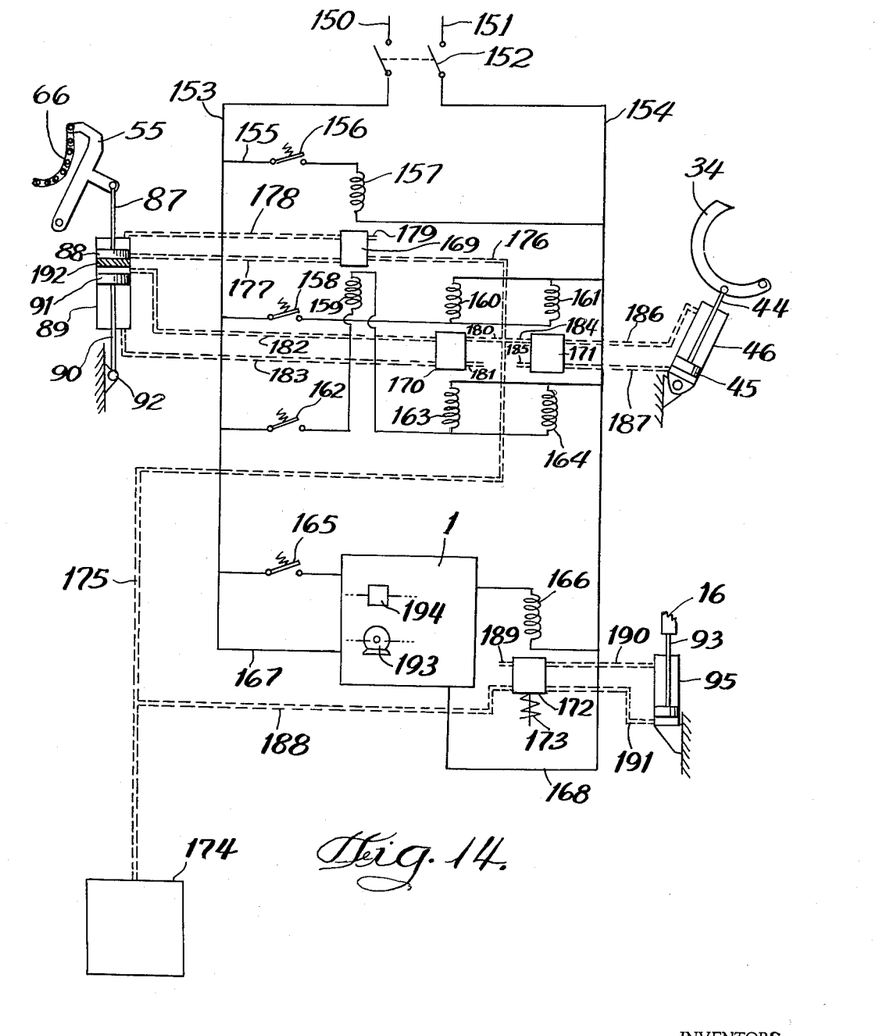
FIG. 14 shows a diagrammatic representation of the electrical and fluid control means used for operation of the machine.

The pneumatic and electrical operating portions of the machine are shown in FIG. 14. Line voltage is applied between the conductors 150 and 151 which are connected by means of a main switch 152 to conductors 153 and 154. Between these conductors 154 is a conductor 155 provided with switch 156 and solenoid 157 in series with it. In parallel with the conductor 155 is another circuit consisting of a switch 158 in series with two solenoids 160 and 161 in parallel with each other. Another circuit connected between the conductors 153 and 154 consists of a switch 162 in series with a solenoid 159 and two solenoids 163 and 164 in parallel with each other. In parallel with the first three of these circuits and connected between the conductors 153 and 154 is another switch 165 connected in series with the electrical components of the strapping head 1 in series with another solenoid 166. Also, a conductor 167 connects to the electrical components of the strapping head 1 on one side and another conductor 168 connects to the electrical components of the strapping head 1 on its other side. The solenoids 157 and 159 are contained in the solenoid valve 169 in order to operate it, the solenoids 160 and 163 are contained in the solenoid valve 170 for its operation, the solenoids 161 and 164 are contained in the solenoid valve 171 and the solenoid 166 is contained in the solenoid valve 172 for its operation. Whereas solenoid valve 172 has only a single solenoid 166 for its operation in one direction it is provided with a spring return 173 for its operation in the other direction. The other solenoid valves 169, 170, 171 and 173 are provided with two solenoids each as mentioned, one each for operating a valve in one direction and another for operating the valve in its other direction.

A high pressure air source 174 is provided for operation of the air cylinders 46, 89 and 95 of the apparatus under the control of the solenoid valves 169, 170, 171 and 173. As mentioned, the cylinder 46 controls the operation of the strap guide 34, the operation of the cylinder 89 controls the actuation of the arm 55 which in turn actuates the chain 66 to encircle around the pipes 3 for purposes of bundling the pipes, and the cylinder 95 is used to operate the strap gripper 16 which grips the leading strap end 7a at a time when the strap loop encircled around the bundle of pipes is to be tensioned.

The high pressure source 174 is provided with a main air line 175 leading from it to supply high pressure air through the solenoid valves 169, 170, 171 and 173. High pressure air is directed from air line 175 to air line 176 to the solenoid valve 169. The solenoid valve 169 is provided with two air lines 177 and 178 which lead to opposite sides of the upper portion of the cylinder 89. The solenoid valve 169 is also provided with an exhaust port 179. Air under pressure is directed from air line 175 through air line 180 to the solenoid valve 170 which is provided with an exhaust port 181 and two air lines 182 and 183 which lead to opposite ends of the lower portion of the cylinder 89. High pressure air is directed from air line 175 by way of air line 184 to solenoid valve 171 which is also provided with an exhaust port 185. Two air lines 186 and 187 lead from the solenoid valve 171 to opposite ends of the cylinder 46. High pressure air is led from high pressure air line 175 by means of air line 188 to the solenoid valve 172 which is provided with an exhaust port 189. Also connected from the valve 172 are two air lines 190 and 191 which connect to opposite ends of the cylinder 95.

Figure 6:
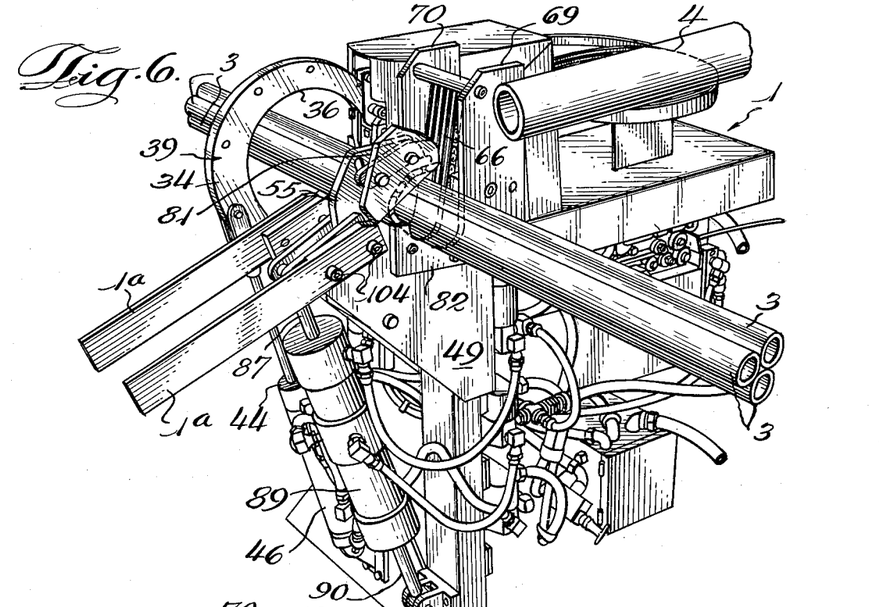

In operation, line voltage is applied to the conductors 153 and 154 by closing the switch 152. At this time none of the solenoids are energized since their energization depends upon the closing of the switches 156, 158, 162 and 165. When the parts of the machine are in their positions as shown in FIG. 4, the machine is prepared for reception of some of the pipes 3 by transporting them from the rails 4 into the pipe receiving zone 54. In order to get the parts of the machine in the positions as shown in FIG. 4, the switch 156 is closed. This causes energization of the solenoid 157 which positions the solenoid 169 to allow air under pressure to be connected from the air lines 175 and 176 through the valve 169 to air line 177 to cause the piston rod 87 to be extended. Exhaust from the upper portion of the cylinder 89 occurs through line 178 the valve 169 and to the exhaust port 179. When the piston rod 87 is extended, it causes the arm 55 to pivot and the chain 66 to assume a U-shaped loop around the pipe receiving zone 54. The pipes 3 are then loaded from the rails 4 into the pipe receiving zone 54 and the switch 158 is then closed. Closing the switch 158 energizes the solenoid 160 and 161 which repositions the valves 170 and 171. At this time the valve 170 is positioned so that air under pressure from line 175 is passed through line 180, the valve 170, line 182 and into the cylinder 89 to cause the piston rod 92 to be extended relative to the cylinder 89. Since the piston rod 90 is fixed on a pivot 92, the cylinder 89 actually raises relative to the piston rod 90. This motion of the cylinder 89 causes the arm 55 to pivot further and cause the chain 66 to be bundled around the pipes 3 resting in the pipe receiving zone 54. Exhaust from the cylinder 89 occurs through line 183 the valve 170 and the exhaust port 181. The actuation of the valve 171 causes air under pressure to be fed from the line 175 to the line 184, the valve 171 and into the cylinder 46 by way of line 187. This causes the piston rod 44 to extend and pivot the strap guide 34 into a position surrounding the pipes 3. Consequently, after actuation of both of these valves 170 and 171 in a manner described, all parts of the machine are as shown in FIG. 6 with the pipes 3 held bundled and clamped against the front face of the strapping head or machine 1.

At this time a switch 165 is closed and this switch is connected to initiate the operation of the strapping head or machine 1. The particular connections within the strapping head 1 have been deliberately omitted because it is believed that the invention can be adapted for use on many different strapping heads and that any particular electrical operating controls for a particular machine are not germane to the invention. However, within a strapping head appropriate for use in combination with this invention, it is desirable that the strapping head 1 be provided with a strap feed motor 193 and a strap feed clutch 194 which causes the motor 193 to be mechanically connected to drive the strap feed wheel 18 which is shown in FIG. 3. When the switch 165 is closed, the feed clutch 194 is ordinarily first energized to connect the motor 193 to drive the feed wheel 18 in a direction to cause the strap 7 to be drawn off from an unreeler 6 and be fed past the front face of the strapping head 1 and into the guide 34 which guides it into a loop around the clamped bundle of pipes 3 as shown in FIG. 2A with the leading end 7a and the supply end 7b of the strap 7 positioned in overlapping relationship with each other ready for the formation of an interlocking joint between the two strap ends. The switch 165 can be held down long enough to start the strapping machine cycle and then released, after which time the strapping machine can be provided with controls for completing its own cycle. At the end of the strap feed portion, the control circuits of the strapping machine cause the solenoid 166 to energize to change the position of the valve 172 and cause air under pressure to be directed from the air line 175 to the line 188, the valve 172, the line 191 and into the lower end of the cylinder 95 to cause the piston rod 93 to be extended which causes the strap gripper 16 to be elevated into strap gripping position as shown in phantom lines in FIG. 2A with the strap gripper 16 urging the strap against the lower most pipe 3. After the strap gripping operation has been completed, the strapping unit is such that it causes the supply end 7b of the strap to be withdrawn to shrink the loop of strap formed in the strap guide 34 closely around the bundle of pipes 3, and then causes the strap joint forming unit 10 to form an interlocking joint between a seal 12 and the ends of the strap 7. At the end of the strap joint forming stroke, the cutoff unit 11 causes the supply end 7b of the strap 7 to be severed from the loop of strap encircled and joined at its ends about the bundle of pipes 3. In this manner, a loop of strap is tightly secured to maintain the pipes bundled in fixed positions relative to each other.

At some time after the strap joint is formed, the solenoid 166 is deenergized, either by the control circuits for the strapping unit 1 or by release of the switch 165 if the controls are arranged that way. When this occurs the spring return 173 causes the solenoid valve 172 to assume its original position and this causes air under pressure to be admitted from air line 175 to line 188, the valve 172, the line 190 and into the cylinder 95 to cause the piston rod 93 to retract and thereby retract the strap gripper 16. It should be noted that the clamping plate 81 clamps the bundle, as viewed in FIG. 2A above the bundle of pipes 3 in a direction opposed to the pressure of the strap gripper 16. If this was not so, the strap gripper 16 would push the pipes vertically upward and prevent their proper strapping because they would be displaced from their proper positions in the pipe receiving zone 54.

After the strap 7 is secured on the pipe bundle, the switch 162 is closed to energize solenoids 159, 163 and 164. Energizing solenoid 159 returns the valve 169 to its original position which causes air under pressure to be admitted to the cylinder 89 to cause the piston rod 87 to be retracted. Energization of solenoid 163 causes the valve 170 to return to its original position whereby air under pressure is admitted to the cylinder 89 through line 183 which causes the piston rod 90 to be retracted within the cylinder 89. This simultaneous retraction of piston rods 87 and 90 causes the arm 55 to be pivoted downward to a position as shown in FIG. 7 where the chain 66 is extended longitudinally into a taut straight inclined path. As this occurs, the strapped pipe bundle positioned in the pipe receiving zone 54 is raised vertically and ejected down the inclined slide rails 1a and dropped onto the receiving platforms 8 in front of the machine as viewed in FIG. 1. During this pipe bundle ejection period, energization of the solenoid 164 changes the position of the valve 171 to cause air under pressure to be delivered from the line 175 to the line 184, the valve 171, and the line 186 and into the cylinder 46 to cause the piston rod 44 to be retracted. Retraction of this piston rod 44 retracts the strap guide 34 and finally, all parts appear as shown in FIG. 7.

When it is desired to begin a new strapping cycle, the switch 156 is again closed and this causes air under pressure to extend the piston rod 87 and again move the arm 55 to its position as shown in FIG. 4 ready for the reception of a new group of pipes 3 into the pipe receiving zone 54.

Although not explained in every instance, it should be apparent that when air under pressure is supplied from the air line 175 to any one of the cylinders 46, 89 and 95, the air is exhausted from the cylinders on the opposite sides of the piston of the cylinders through the exhaust ports 179, 181, 185 and 189 of their respective valves. The electrical and pneumatic portions of the apparatus have been described only for the operation of a single unit even though two units are shown in FIG. 1 and it has been stated that three or more units can be provided if necessary. In order to provide for the proper operation of the second or more units, it is only necessary to provide additional valves identical to valves 169, 170, 171, and 172 and connect their respective solenoids in parallel. This can also be accomplished in another way and that is to connect respective air lines of additional units in parallel with those of the first unit and this will allow the use of only one set of valves, assuming that the valves are of the proper capacity and the air lines are also.

Although only a single embodiment of the invention has been shown and described, it should be understood that the invention can be made in many different ways without departing from the true scope of the invention as defined by the appended claims.

We claim:

1. A machine for binding together elongated objects comprising, a storage rack for storing a supply of the objects, a yoke for receiving and supporting a plurality of the objects dropped by the force of gravity from said storage rack, said yoke being shaped to guide the objects as they fall from the storage rack into a predetermined arrangement in the yoke, a flexible sling suspended to hang in an approximate U-shape about the vicinity of the yoke, actuating means connected to the sling for closing the sling into a substantially closed loop about said plurality of objects in the yoke and clamping them into a close bundle in fixed positions relative to each other, a strap guide pivotally mounted for movement between a first position providing for clear passage of the objects into said yoke and a second position encircling the bundle of objects in the yoke, and strap feed means aligned to direct and feed strap into said strap guide and guide the strap into a closed loop about the bundle when the strap guide is in its second position.

2. A machine as defined by claim 1 characterized by, and means for tensioning the strap loop and securing it onto the bundle.

3. A machine for binding together elongated objects comprising, a storage rack for storing a supply of the objects, a yoke for receiving and supporting a plurality of the objects transported from said storage rack, a flexible sling suspended to hang around the vicinity of the yoke, actuating means for closing the sling into a loop about said plurality of objects and clamping them into a close bundle in fixed positions relative to each other, a strap guide mounted for movement between a first position clear of said bundle and a second position encircling the bundle, strap feed means aligned with said strap guide for feeding a length of strap endwise into said strap guide to form a closed strap loop about the bundle with the leading end of the strap overlapping its supply end when the strap guide is in its second position, a strap gripper for gripping the leading strap end against the bundle, and strapping means for withdrawing the supply strap end to shrink the loop about the bundle and for securing the loop onto the bundle.

4. In apparatus for bundling together elongated objects in combination with a strapping head of a type adapted for providing a length of strap for the formation of a strap loop about the objects with the strap ends overlapping each other and for shrinking the loop onto the objects and for joining together the overlapping strap ends comprising, storing means adjacent the strapping head for storing a supply of the objects, a yoke for receiving and supporting a plurality of the objects transferred from said supply, bundling means connected to said yoke for encircling the plurality of objects and clamping them into a tight bundle against the face of the strapping head adjacent its strap end joining region, a strap guide mounted for movement between a first position providing for clear passage of the objects into said yoke from said storing means and a second position encircling the bundle of objects in the yoke, said strap guide in its second position being positioned for the reception of a strap fed into it from said strapping head so that the strap is encircled into a closed loop about the bundle, said strapping head causing the strap loop to be shrunk onto the bundle and a joint to be formed between the overlapping ends of the strap loop.

5. In apparatus for bundling together elongated objects in combination with a strapping head of a type adapted for providing a length of strap for the formation of a strap loop about the objects with the strap ends overlapping each other and for shrinking the strap loop onto the objects and having joint forming means for joining together the overlapping strap ends comprising, a yoke shaped and positioned relative to said joint forming means for receiving and supporting a plurality of elongated objects in a predetermined arrangement with at least two of the objects positioned contiguous to each other against the strapping head with the said joint forming means located approximately midway between the said two objects whereby any space provided adjacent the region where the objects are contiguous because of the shapes of the objects can provide clearance for portions of the joint forming means to reach behind the overlapping strap ends for suitably joining together the overlapping strap ends.

6. In apparatus for bundling together elongated objects in combination with a strapping head of a type adapted for providing a length of strap for the formation of a strap loop about the objects with the strap ends overlapping each other and for shrinking the strap loop onto the objects and having joint forming means for joining together the overlapping strap ends comprising, a support having an object supporting surface extending at a sixty degree angle with the outer surface of the strapping head at its joint forming region to provide a sixty degree angular yoke for the reception of elongated objects, bundling means adjacent said support for encircling and clamping a plurality of elongated objects against the said outer surface of the strapping head and provided with a clamp having a clamping surface which contacts a region of the objects opposite said object supporting surface at a sixty degree angle with it when the bundling means is in a clamping position to thereby form an isosceles triangle between the three surfaces.

7. In apparatus for bundling together elongated cylindrical objects in combination with a strapping head of a type adapted for providing a length of strap for the formation of a strap loop about the objects with the strap ends overlapping each other and for shrinking the strap loop onto the objects and having joint forming means for joining together the overlapping strap ends comprising, a support having an object supporting surface shaped to support a plurality of objects with two or more of the objects in a row extending at sixty degrees with the outer surface of the strapping head, bundling means adjacent said support for encircling and clamping the plurality of elongated objects in a bundle against said outer surface of the strapping head and said support, said bundling means having a clamp with a clamping surface which contacts a region of the objects opposite said object supporting surface at a sixty degree angle with it when the bundling means is in a clamping position to thereby substantially form an isosceles triangle between the three surfaces.

8. In an apparatus as defined by claim 6 characterized by said support being positioned relative to said joint forming means so that two of the objects are clamped against the outer surface of the strapping head contiguous to each other and with the joint forming means located approximately midway between the said two objects.

9. In an apparatus as defined by claim 7 characterized by said support being positioned relative to said joint forming means so that two of the objects are clamped against the outer surface of the strapping head contiguous to each other and with the joint forming means located approximately midway between the said two objects.

10. In apparatus for bundling together elongated objects in combination with a strapping head of a type adapted for providing a length of strap for the formation of a strap loop about the objects with the strap ends overlapping each other and for shrinking the loop onto the objects and for joining together the overlapping strap ends comprising, storing means adjacent the strapping head for storing a supply of the objects, a yoke for receiving and supporting a plurality of the objects transferred from said supply, bundling means connected adjacent to said yoke for movement between three positions, a first position allowing for the clear passage of the objects from the storing means to the yoke, a second position for encircling the plurality of objects in the yoke and clamping them into a tight bundle against the face of the strapping head adjacent its strap end joining region, and a third position for ejecting the plurality of objects from the yoke.

11. In apparatus for bundling together elongated objects in combination with a strapping head of a type adapted for providing a length of strap for the formation of a strap loop about the objects with the strap ends overlapping each other and for shrinking the loop onto the objects and for joining together the overlapping strap ends comprising, a yoke for receiving and supporting a plurality of the objects, bundling means adjacent said yoke for movement between three positions, a first position allowing clear passage of the objects into the yoke, a second position for encircling the plurality of objects in the yoke and clamping them into a tight bundle against the face of the strapping head adjacent its strap-end joining region, and a third position for ejecting the plurality of objects from the yoke.

12. In apparatus for bundling together elongated objects in combination with a strapping head of a type adapted for providing a length of strap for the formation of a strap loop about the objects with the strap ends overlapping each other and for shrinking the loop onto the objects and for joining together the overlapping strap ends comprising, a yoke for receiving and supporting a plurality of the objects, bundling means adjacent said yoke for movement between three positions, a first position allowing clear passage of the objects into the yoke, a second position for encircling the plurality of objects in the yoke and clamping them into a tight bundle against the face of the strapping head adjacent its strap end joining region, and a third position for ejecting the plurality of objects from the yoke, a strap guide adjacent to said bundling means mounted for movement between a first position allowing for clear passage of the objects into and out of the yoke and a second position encircling the objects in the yoke where it can receive a length of strap fed endwise from said strapping head to cause the strap to be encircled in a loop about the objects in the yoke.

13. In apparatus for bundling together elongated objects in combination with a strapping head of a type adapted for providing a length of strap for the formation of a strap loop about the objects with the strap ends overlapping each other and for shrinking the loop onto the objects and for joining together the overlapping strap ends comprising, a yoke for receiving and supporting a plurality of the objects adjacent the strap joining region of the strapping head, a bundling sling adjacent the yoke for movement between three positions, a first position with the sling hanging in a U-shape about the yoke for allowing clear passage of the objects into the yoke, a second position with the sling wrapped about the objects in the yoke and clamping the objects into a tight bundle against the strap joining region of the strapping head, and a third position with the sling raised into a longitudinally straight and taut incline for ejecting the objects from the yoke.

14. In apparatus for bundling together elongated objects in combination with a strapping head of a type adapted for providing a length of strap for the formation of a strap loop about the objects with the strap ends overlapping each other and for shrinking the loop onto the objects and for joining together the overlapping strap ends comprising, a yoke for receiving and supporting a plurality of the objects adjacent the strap joining region of the strapping head, a bundling sling adjacent the yoke for movement between three positions, a first position with the sling hanging in a U-shape about the yoke for allowing clear passage of the objects into the yoke, a second position with the sling wrapped about the objects in the yoke and clamping the objects into a tight bundle against the strap joining region of the strapping head, and a third position with the sling raised into a longitudinally straight and taut incline for ejecting the objects from the yoke, said bundling sling being a flexible chain.

15. In apparatus for bundling together elongated objects in combination with a strapping head of a type adapted for providing a length of strap for the formation of a strap loop about the objects with the strap ends overlapping each other and for shrinking the loop onto the objects and for joining together the overlapping strap ends comprising, a yoke for receiving and supporting a plurality of the objects adjacent the strap joining region of the strapping head, a bundling sling adjacent the yoke for movement between three positions, a first position with the sling hanging in a U-shape about the yoke for allowing clear passage of the objects into the yoke, a second position with the sling wrapped about the objects in the yoke and clamping the objects into a tight bundle against the strap joining region of the strapping head, and a third position with the sling raised into a longitudinally straight and taut incline for ejecting the objects from the yoke, a strap guide adjacent to said bundling sling for movement between a first position allowing for clear passage of the objects into and out of the yoke and a second position encircling the objects in the yoke where it can receive a length of strap fed endwise from said strapping head to cause the strap to be encircled in a loop about the objects in the yoke.

16. In apparatus for bundling together elongated objects in combination with a strapping head of a type adapted for providing a length of strap for the formation of a strap loop about the objects with the strap ends overlapping each other and for shrinking the loop onto the objects and for joining together the overlapping strap ends comprising, a yoke for receiving and supporting a plurality of the objects adjacent the strap joining region of the strapping head, a bundling sling adjacent the yoke for movement between three positions, a first position with the sling hanging in a U-shape about the yoke for allowing clear passage of the objects into the yoke, a second position with the sling wrapped about the objects in the yoke and clamping the objects into a tight bundle against the strap joining region of the strapping head, and a third position with the sling raised into a longitudinally straight and taut incline for ejecting the objects from the yoke, said bundling sling being a flexible chain, a strap guide adjacent to said bundling sling for movement between a first position allowing for clear passage of the objects into and out of the yoke and a second position encircling the objects in the yoke where it can receive a length of strap fed endwise from said strapping head to cause the strap to be encircled in a loop about the objects in the yoke.

References Cited in the file of this patent

UNITED STATES PATENTS

| | | |
|---|---|---|
| 969,057 | Hayes | Aug. 30, 1910 |
| 1,464,332 | Pease | Aug. 7, 1923 |
| 1,650,844 | McChesney | Nov. 29, 1927 |
| 1,969,160 | Slusher | Aug. 7, 1934 |